United States Patent [19]

Watanabe et al.

[11] Patent Number: 4,811,222
[45] Date of Patent: Mar. 7, 1989

[54] METHOD AND APPARATUS FOR CONTROLLING ELECTROMAGNETIC POWDER CLUTCH FOR VEHICLE

[75] Inventors: Tomoyuki Watanabe; Setsuo Tokoro; Takashi Hayashi; Takashi Shigematsu, all of Susono, Japan

[73] Assignee: Toyota Jidosha Kabushiki Kaisha, Japan

[21] Appl. No.: 839,219

[22] Filed: Mar. 13, 1986

[30] Foreign Application Priority Data

Mar. 14, 1985 [JP] Japan .................................. 60-50739

[51] Int. Cl.⁴ .............................................. B60K 17/08
[52] U.S. Cl. ................................ 364/424.1; 192/21.5; 192/0.033; 310/105
[58] Field of Search ................... 364/424.1; 192/0.076, 192/0.096, 0.033, 21.5; 310/105

[56] References Cited

FOREIGN PATENT DOCUMENTS 58-657 5/1983 Japan .

Primary Examiner—Parshotam S. Lall
Attorney, Agent, or Firm—Parkhurst, Oliff & Berridge

[57] ABSTRACT

Method and apparatus for controlling an electromagnetic powder clutch connected to a vehicle engine and including a coil for engaging the powder clutch to transmit an output torque of the engine as a function of an electric current to be applied to the coil such that a variation in the engine torque is absorbed by a slip of the powder clutch. An optimum amount of slip of the powder clutch is determined based on a currently required engine output and a detected output speed of the clutch. A basic control value for controlling a magnitude of the electric current to be applied to the coil is determined based on the detected engine torque, such that the determined magnitude of the electric current permits engagement of the clutch so as to transmit the detected engine output torque. The basic control value is compensated for the determined optimum amount of slip of the clutch, thereby adjusting the transmission torque of the clutch so as to absorb the variation in the output torque of the engine.

8 Claims, 5 Drawing Sheets

S8 — DETERMINING TARGET ENGINE SPEED $N^*$
$N^* = Nin + \Delta Ns$

S15 — ADJUSTING COMPENSATION VALUE $\Delta Tcl$
$\Delta Tcl \leftarrow \Delta Tcl + (N^* - Ne) \cdot K$ S12 — CALCULATING CLUTCH TORQUE $Tcl$
$Tcl = |Te| + \Delta Tcl$

S14 — APPLYING COIL-CONTROL SIGNAL TO V/I CONVERTER 76

RETURN

METHOD AND APPARATUS FOR CONTROLLING ELECTROMAGNETIC POWDER CLUTCH FOR VEHICLE

BACKGROUND OF THE INVENTION

1. Field of the Art

The present invention relates to a method and an apparatus for controlling an electromagnetic powder clutch for use on an automotive vehicle.

2. Related Art Statement

In the automotive vehicle art, it is recognized that the fuel economy of the vehicle is improved when the engine is operated at a relatively low speed and under a relatively high load. This low speed-high load operating condition is established by controlling a speed ratio of a transmission of the vehicle or selecting a suitable speed range of the transmission. In the low speed-high load operating condition, however, fluctuation in output torque of the engine tends to be large due to a comparatively long ignition interval of the engine. The resulting vibrations and noises felt by the vehicle operator are accordingly increased, and driving comfort is deteriorated. These inconveniences are considered a barrier to practicing the above-indicated low speed-high load control method, which is otherwise effective to enable the engine to provide a sufficient average output to drive the vehicle with a high level of fuel economy.

It is known to use an electromagnetic powder clutch which is disposed between an engine and a transmission to transmit the output of the engine to the transmission. An example of an arrangement incorporating such an electromagnetic powder clutch is disclosed in Japanese Patent Application, laid open in 1983 under Publication No. 58-657. In the disclosed arrangement, the engagement of the powder clutch is controlled so as to absorb variations in the output torque of the engine by positively giving the powder clutch a small amount of slip such that the output speed of the powder clutch is lower than the input speed by a value equal to the slip speed of the clutch that is, the difference between the input and output speeds of the clutch. This slip speed is selected to be larger than an average variation in the input speed of the clutch caused by variations in the output torque of the engine. Thus, the disclosed arrangement is useful for improving the driving comfort of the vehicle while the engine is operated at low speeds.

However, the method of controlling the powder clutch as disclosed in the document identified above is not satisfactory in terms of operating response of the powder clutch to engine torque variation. Specifically, the torque to be transmitted by the powder clutch should be finely controlled so that the slip speed of the powder clutch falls within a very small range, for example, from 10 to 30 rpm. To control the engagement of the powder clutch for stable and accurate fine adjustment of its slip, the magnitude of a signal for adjusting the amount of slip of the powder clutch should be varied slightly each time a control cycle is repeated. In other words, the slip adjustment value updated in each control cycle tends to be very small. Consequently, the signal for adjusting the amount of slip of the powder clutch may not be sufficiently responsive to variations in the output torque of the engine when the engine torque is varied at a high rate, such as during a rapid increase in the opening angle of a throttle valve. In such conditions, the amount of slip of the powder clutch is likely to be excessive, and the driving comfort and fuel economy of the vehicle lowered.

SUMMARY OF THE INVENTION

It is accordingly an object of the present invention to provide a method of controlling an electromagnetic powder clutch for an automotive vehicle, wherein a suitable amount of slip is given to the clutch to allow for maximum driving comfort, minimum fuel consumption of the vehicle and high response to variations in the output torque of an engine of the vehicle.

Another object of the invention is to provide a controlling apparatus suitable for practicing the method of the invention.

According to the present invention, there is provided a method of controlling an electromagnetic powder clutch which is incorporated in a power transmission system of a vehicle to transmit an output torque of an engine to drive wheels. Said controlling method includes an electromagnetic coil for engaging the powder clutch wherein the clutch torque to be transmitted by the powder clutch is varied as a function of an electric current applied to the electromagnetic coil so that variations in the output torque of the engine are absorbed by a slight amount of slip of the powder clutch by: (a) detecting a currently required output of the engine; (b) detecting an output speed of the powder clutch; (c) determining an optimum amount of slip of the powder clutch based on the detected required output of the engine and the detected output speed of the powder clutch according to a predetermined relation between the optimum amount of slip, the required output of the engine and the output speed of the powder clutch; (d) determining the output torque of the engine; (e) determining a value for controlling the magnitude of the electric current based on the determined output torque of the engine, such that the magnitude of the electric current permits engagement of the powder clutch so that the clutch torque is substantially equal to the determined output torque of the engine; and (f) compensating this value for the optimum amount of slip, thereby adjusting the clutch torque to absorb the variation in the output torque of the engine.

In the controlling method of the invention, the optimum amount of slip of the powder clutch is determined by the currently required output of the engine and the detected output speed of the powder clutch. The basic control value for the electromagnetic coil is determined so that the clutch torque to be transmitted by the powder clutch is substantially equal to the detected output torque of the engine. This basic control value is varied so that the powder clutch has the determined optimum amount of slip so as to absorb variations in the output torque of the engine. This arrangement makes it possible to determine the optimum amount of slip of the powder clutch and the basic control value for the electromagnetic coil with rapid response to variations in the required output of the engine and in the output speed of the clutch, since the optimum slip amount of the clutch is determined directly from the currently required engine output and the detected output speed of the clutch and the basic control amount is determined from the detected output torque of the engine. Hence, the present method is capable of maintaining high levels of driving comfort and fuel economy even when the required output of the engine and the output speed of the powder clutch are rapidly changed.

According to one embodiment of the invention, the basic control value is compensated by a value which is adjusted by addition thereto or subtraction therefrom of a predetermined adjustment value.

According to an alternative embodiment of the invention, the method further comprises the steps of determining the target speed of the engine, based on the detected output speed of the powder clutch and the determined optimum amount of slip of the powder clutch, and the actual speed of the engine. In this case, the basic control value is compensated by a value which is adjusted by the addition thereto or subtraction therefrom of an adjustment value that is variable in proportion to a difference between the target speed and the actual speed of the engine.

According to another embodiment of the invention, the basic control value is compensated by a value which is determined based on the detected required output of the engine and the detected output speed of the powder clutch, according to a predetermined relation between the compensation value, the detected required output of the engine and the detected output speed of the powder clutch. The predetermined relation is stored in a memory and updated in each control cycle of the method.

According to another embodiment of the invention, the method further comprises a step of detecting the actual speed of the engine. The output torque of the engine is determined from the detected required output of the engine and the detected actual speed of the engine, according to a predetermined relation between the output torque, the required output and the actual speed of the engine.

According to another aspect of the present invention, there is provided an apparatus suitable for practicing the method of the invention. The apparatus is comprised of: (a) means for detecting the currently required output of the engine; (b) means for detecting the output speed of the powder clutch; (c) means for determining the optimum amount of slip of the powder clutch based on the detected required output of the engine and the detected output speed of the powder clutch, according to a predetermined relation between the optimum amount of slip, the required output of the engine and the output speed of the powder clutch; (d) means for determining the output torque of the engine; (e) means for determining a basic control value for controlling a magnitude of the electric current based on the detected output torque of the engine, such that the magnitude of the electric current permits engagement of the powder clutch so as to provide the output torque of the engine as the clutch torque; and (f) means for compensating the basic control value for the optimum amount of slip of the powder clutch, thereby adjusting the clutch torque to absorb variations in the output torque of the engine.

In accordance with one preferred embodiment of the invention, the apparatus further comprises means for determining the target speed of the engine by adding the optimum amount of slip of the powder clutch to the detected output speed of the powder clutch, and means for detecting the actual speed of the engine. In this embodiment, the compensating means is comprised of means for determining a compensation value based on the detected required output of the engine and the detected output speed of the powder clutch according to a predetermined relation between the compensation value, the required output of the engine and the output speed of the powder clutch. The compensating means is further comprised of means for adjusting the determined compensation value to be added to or subtracted from the basic control value, such that the detected actual speed of the engine matches the determined target speed of the engine.

In one form of the above embodiment, the compensating means comprises a memory for storing data representative of the predetermined relation among the compensation value, the required output of the engine and the output speed of the powder clutch. The compensating means is further comprised of means for replacing the compensation value currently stored in the memory with the determined compensation value which has been adjusted by the adjusting means, such that the predetermined relation stored in the memory is updated in each control cycle of the apparatus.

BRIEF DESCRIPTION OF THE DRAWINGS

The foregoing and other objects, features and advantages of the present invention will be better understood by reading the following detailed description of preferred embodiments of the invention, when considered in connection with the accompanying drawings, in which.

DETAILED DESCRIPTION OF THE PREFERRED EMBODIMENTS

To further clarify the concept of the present invention, the preferred embodiments of the invention will be described in detail with reference to the accompanying drawings.

Figure 1:
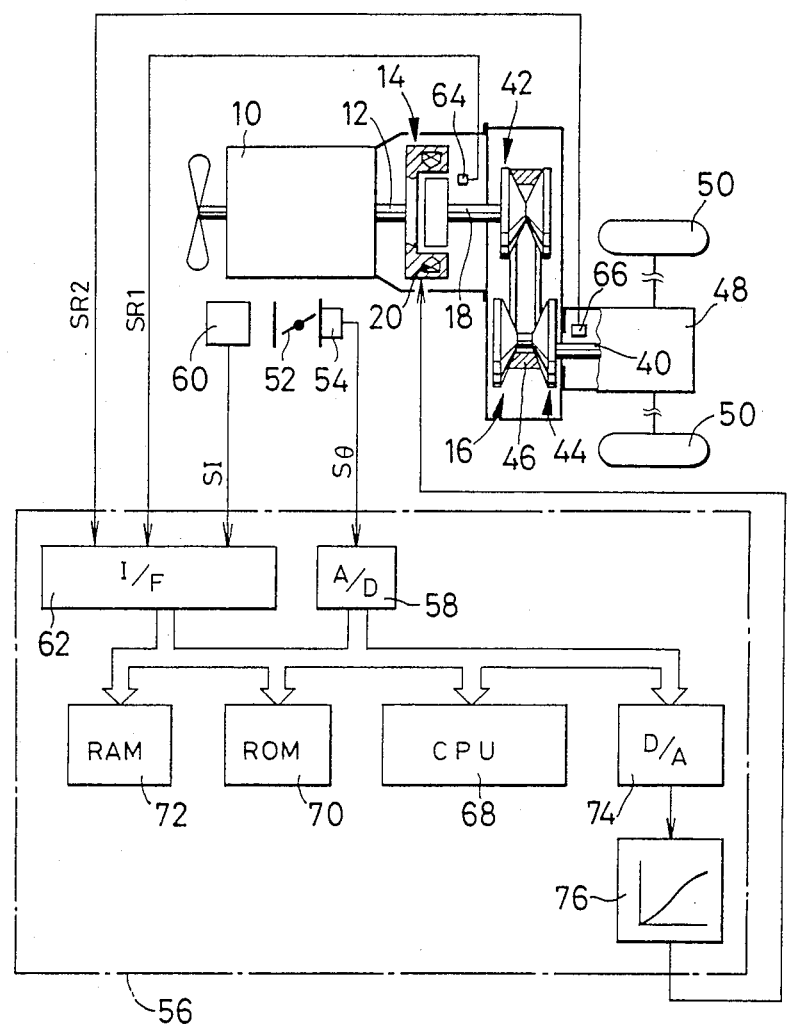
FIG. 1 is a schematic illustration of a power transmission system incorporating an electromagnetic powder clutch and one embodiment of an apparatus for controlling the electromagnetic powder clutch.

There is shown in FIG. 1 a power transmission system of an automotive vehicle, wherein a crankshaft 12 of an engine 10 is connected via an electromagnetic powder clutch 14 to an input shaft 18 of a continuously variable transmission (CVT) 16 of a belt-and-pulley type (hereinafter referred to as "transmission 16").

Figure 2:
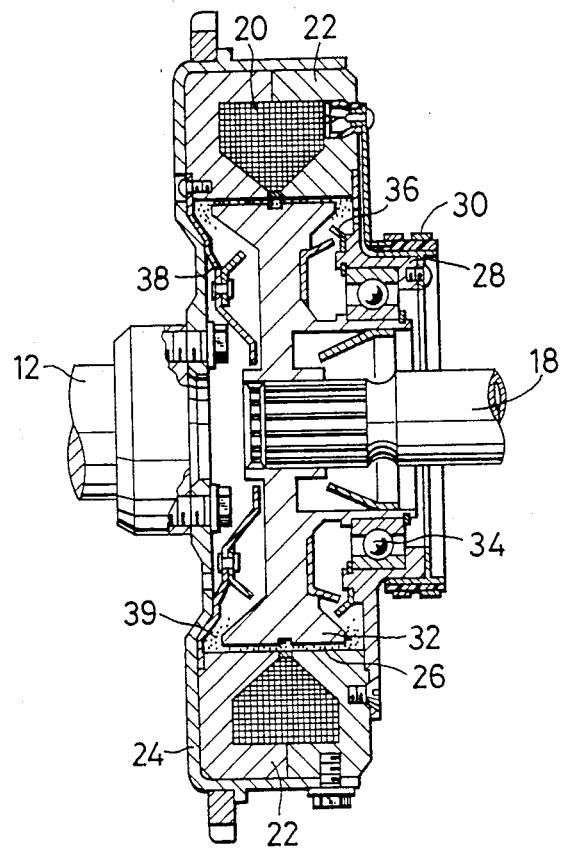
FIG. 2 is an enlarged cross section view of the electromagnetic powder clutch of FIG. 1.
Figure 3:
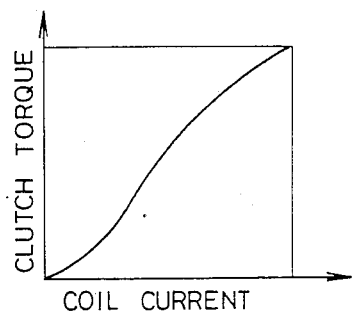
FIG. 3 is a graphical representation of the variation in transmission torque of the powder clutch of FIG. 2, as a function of the amount of electric current applied to an electromagnetic coil of the powder clutch.

The electromagnetic powder clutch 14 (hereinafter referred to as "powder clutch 14") is constructed so as to transmit the torque of the engine 10 to the transmission 16, through the engagement of a driving rotary member and a driven rotary member by the energizing of an electromagnetic coil 20. More specifically, the powder clutch 14 of FIG. 2 is comprised of an annular yoke 22 serving as a driving rotary member and a rotor 32 serving as a driven rotary member. The annular yoke 22 is fixed to the crankshaft 12 through an outer support member 24. The electromagnetic coil 20, also annular in shape, is embedded in the annular yoke 22. An electric current is applied to the electromagnetic coil 20 through slip rings 30 which are attached to a labyrinth support 28 that rotates with the annular yoke 22. The rotor 32 is disposed within the annular yoke 22 in coaxial relation therewith and is supported by the labyrinth support 28 via a bearing 34 so that the rotor 32 and the annular yoke 22 are rotatable relative to each other. The rotor 32 is coupled to one end of the previously indicated input shaft 18 of the transmission 16, by means of a spline. The labyrinth support 28 has a first annular labyrinth 36 fixed thereto, and a second annular labyrinth 38 attached to the inner surface of the outer support member 38. These first and second annular labyrinths 36, 38 cooperate with the rotor 32 and the annular yoke 22, to define a substantially enclosed annular gap 26 which accommodates a mass of electromagnetic powder 39. Upon energization of the electromagnetic coil 20, the particles of the powder 39 are exposed to a magnetic field produced by the coil 20, whereby a gap between the inner surface of the yoke 22 and the outer surface of the rotor 32 is filled with the magnetized particles, which are tightly bonded together by the force of the magnetic field. As a result, the driving rotary member in the form of the yoke 22 engages the driven rotary member in the form of the rotor 32, via the magnetized powder mass 39, so as to transmit the torque of the crankshaft 12 to the input shaft 18 of the transmission 16. The torque to be transmitted by the powder clutch 14 (hereinafter referred to as "clutch torque"), is varied as a function of the electric current passing through the electromagnetic coil 20. The clutch torque is varied according to the torque-current curve in FIG. 3, representing the specific transmission characteristic of the powder clutch 14.

Referring to FIG. 1, the transmission 16 comprises a first variable-diameter pulley 42 rotatable with the input shaft 18, a second variable-diameter pulley 44 rotatable with the output shaft 40 and a transmission belt 46 connecting the two pulleys 42, 44. The effective diameters of the pulleys 42, 44 are variable by hydraulically-operated actuators (not shown) as known in the art, so that the speed ratio of the transmission 16 may be changed as required. The output shaft 40 of the continuously variable transmission 16 is operatively connected to drive wheels 50 of the vehicle via a final reduction gear unit 48 which includes an intermediate gear and a differential gear.

A throttle valve 52 is disposed in an intake manifold of the engine 10. Adjacent to the throttle valve 52 is a throttle sensor 54 which detects an opening angle $\theta$TH of the throttle valve 52, and feeds a THROTTLE signal S$\theta$ to an A/D converter 58 incorporated in a controller 56. The engine 10 is equipped with an igniter 60 which generates an IGNITION signal SI in the form of pulses corresponding to ignition pulses applied to the engine 10. This IGNITION signal SI, which represents a current speed "Ne" of the engine 10, is applied to an I/F circuit 62 in the controller 56. Adjacent to the input and output shafts 18, 40 of the transmission 16 are disposed input and output speed sensors 64, 66. These input and output speed sensors 64, 66 generate respectively an INPUT SPEED signal SR1 and an OUTPUT SPEED signal SR2, in the form of pulses with frequencies corresponding to rotating speeds ("Nin" and "Nout") of the input and output shafts 18, 40 of the transmission 16. The INPUT and OUTPUT SPEED signals SR1 and SR2 are also fed to the I/F circuit 62.

The controller 56 further includes a CPU 68 (central processing unit), a ROM 70 (read-only memory), a RAM 72 (random-access memory), a D/A converter 74 and a V/I converter 76. According to control programs stored in the ROM 70 and by utilizing a temporary data storage function of the RAM 72, the CPU 68 processes the above-indicated signals received from the I/F circuit 62 and the A/D converter 58. Based on this data processing, the CPU 68 feeds clutch-control signals to the V/I converter 76 via a D/A converter 74. The V/I converter 76 applies a controlled electric current to the electromagnetic coil 20 of the powder clutch 14. Similarly, the CPU 68 applies via a suitable interface (not shown) transmission-control signals to a speed-ratio control valve unit incorporated in a hydraulic system for the transmission 16. Based on the transmission-control signals, the speed ratio control valve unit controls the speed ratio of the transmission 16, and the rate of variation of the speed ratio. The ROM 70 stores a data map which represents a relation between the throttle opening angle $\theta$TH, the speed "v" of the vehicle, and the optimum or target speed "N*" of the engine 10. This relation is determined so that a currently required output of the engine 10, determined by the throttle opening angle, is obtained with minimum fuel consumption. The speed ratio of the transmission 16 is controlled so that the actual speed of the engine 10 coincides with the thus determined target engine speed "N*".

Figure 4:
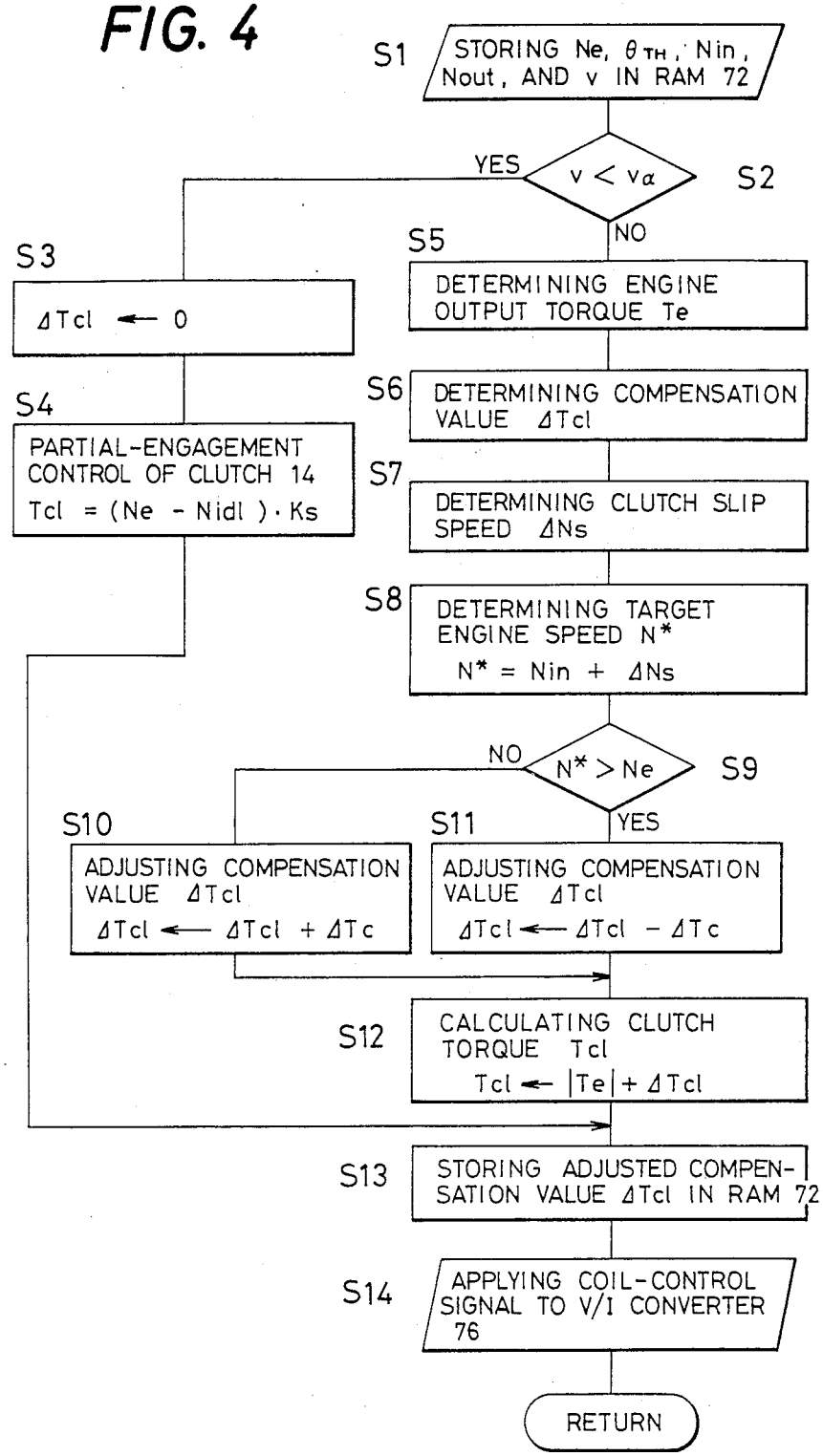
FIG. 4 is a flow chart illustrating events of operation in a control routine which is executed by the control apparatus of FIG. 1.

Referring next to FIG. 4, there will be described the operation of the controller 56 for controlling the electromagnetic powder clutch 14. FIG. 4 illustrates an exemplary control routine for controlling the powder clutch 14. This clutch control routine is an interruption routine which is executed in response to the INPUT SPEED signal SR1. Initially, step S1 is executed to store data in the RAM 72, including engine speed "Ne" represented by the IGNITION signal SI, throttle opening angle $\theta$TH (indicating the currently required output of the engine 10) represented by the THROTTLE signal S$\theta$, rotating speed "Nin" of the input shaft 18 of the transmission 16 (speed of the output shaft of the clutch 14), represented by the INPUT SPEED signal SR1, rotating speed "Nout" of the output shaft 40 of the transmission 16 represented by the OUTPUT SPEED signal SR2 and running speed "v" of the vehicle.

The engine speed "Ne", input and output speeds "Nin" and "Nout" of the transmission 16, throttle opening angle "$\theta$TH", and vehicle running speed "v" are determined or obtained according to the following equations (1), (2), (3), (4) and (5), respectively:

$$Ne = \frac{1}{t_{ig}} \times \frac{180°}{360°} \times 60 \text{ sec. (rpm)} \qquad (1)$$

where, $t_{ig}$: Interval of IGNITION signal SI $$N_{in} = \frac{1}{t_{in}} \times 60 \text{ sec. (rpm)} \qquad (2)$$

where, $t_{in}$: Interval of INPUT SPEED signal SR1

$$N_{out} = \frac{1}{t_{out}} \times 60 \text{ sec. (rpm)} \qquad (3)$$

where, $t_{out}$: Interval of OUTPUT SPEED signal SR2

$$\theta TH = \frac{v - v_{IDL}}{v_{WOT} - v_{IDL}} \times 100(\%) \quad (4)$$

where, $v_{WOT}$: Amplitude of THROTTLE signal S$\theta$ in fully-open position of throttle valve 52

$V_{IDL}$: Amplitude of THROTTLE signal S$\theta$ in idling position of throttle valve 52

$$v = N_{out} \times \frac{1}{R_G} \times 2\pi r \times \frac{1}{60} \times \frac{1}{1000} \text{ (km/h)} \quad (5)$$

where, $R_G$: Gear ratio of the transmission system between output shaft 40 and drive wheels 50 r: Radius of drive wheels 50

After storing the above described values, the CPU 68 goes to step S2 to check if the vehicle speed "v" is lower than a predetermined value "v$\alpha$", that is, to check if the powder clutch 14 should be operated in its partial-engagement mode or in its normal-engagement mode. More specifically, if the vehicle speed "v" is lower than the value "v$\alpha$", the CPU 68 goes to step S4 via step S3 to control the powder clutch 14 in its partial-engagement condition. In step S3, a compensation value "$\Delta$Tc1" of a clutch torque "Tc1" of the powder clutch 14 is zeroed. In the next step S4, the CPU 68 determines a value of the clutch torque "Tc1" which should be transmitted by the powder clutch 14 to the transmission 16 during a partial-engagement of the powder clutch 14, such as when starting the vehicle. This value of the clutch torque "Tc1" is determined based on the actual engine speed "Ne" and the idling speed "Nid1" of the engine 10, according to the following equation (6):

$$Tcl = (Ne - Nidl) \cdot K_s \quad (6)$$

where, $K_s$: Control coefficient (Gain), which is a constant, or a function of the throttle opening angle $\theta$TH or target speed "N*" of the engine 10

When step S2 determines that the vehicle speed "v" is equal to or higher than the predetermined value "v$\alpha$", the CPU 68 judges that the vehicle is running in its normal-engagement mode and is not in a process of starting the vehicle. In this case, step S5 and the subsequent steps are executed in order to control the powder clutch 14 so as to absorb vibrations or noises due to fluctuations or variations in the output torque of the engine 10. In step S5, the CPU 68 determines an actual output torque "Te" of the engine 10, based on the actual engine speed "Ne" and the throttle opening angle "$\theta$TH", according to a predetermined relation between the output engine torque "Te", the engine speed "Ne" and the throttle opening angle "$\theta$TH". As described later in connection with step S12, this actual output torque "Te" of the engine 10 is used as a basic control value for controlling an electric current to the electromagnetic coil 20 of the powder clutch 14.

Figure 5:
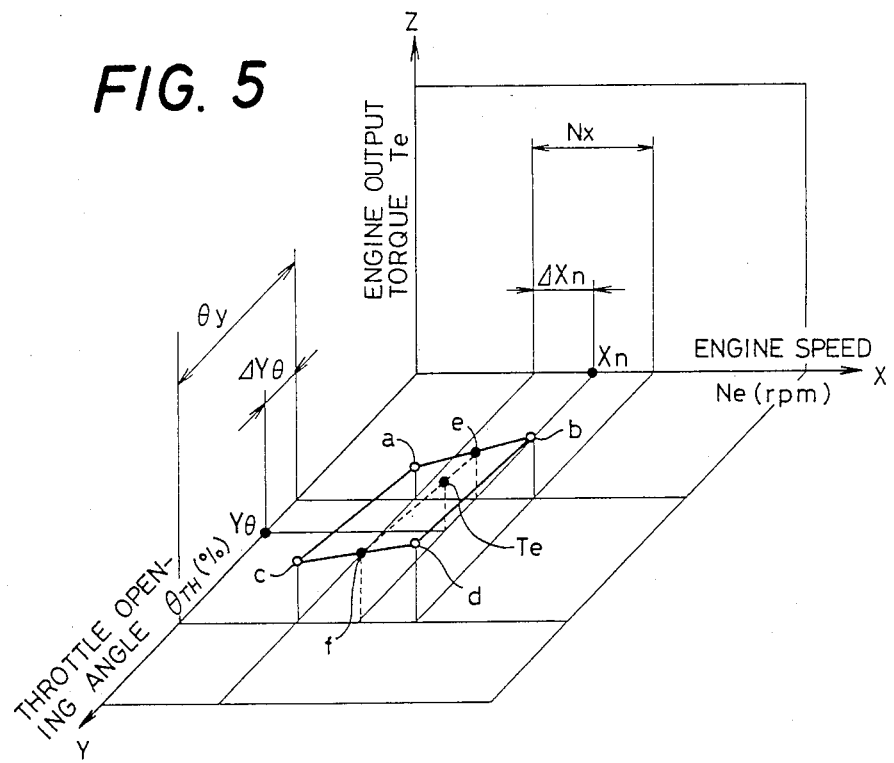
FIG. 5 is a graphical representation of a relation used in the control routine of FIG. 4 for determining an output torque of an engine.

The above-indicated predetermined relation for determining the output engine torque "Te" is stored as a data map in the ROM 70. An example of the data map is illustrated in FIG. 5, wherein the actual engine speed "Ne" (rpm) and the throttle opening angle "$\theta$TH" are plotted along respective X and Y axes in a three-axis coordinate system, in increments of "Nx" and "$\theta$y", respectively. Further, the output engine torque "Te" to be obtained is plotted along a Z axis of the coordinate system. Next, the output engine torque "Te" corresponding to the engine speed "Ne" and the throttle opening angle "$\theta$TH", determined in step S1, is obtained. Initially, the X-axis coordinate point "Xn" ("Ne"/"Nx") of the engine speed "Ne" and the Y-axis coordinate point "Y$\theta$" ("$\theta$TH"/"$\theta$y") are obtained. As shown in FIG. 5, the obtained X-Y coordinate point (Xn, Y$\theta$) is located within a square which is defined by four X-Y coordinate values "a", "b", "c" and "d". Successively, X-axis coordinate values "e" and "f" on lines "a-b" and "c-d" are obtained by interpolation, based on the values "a", "b", "c", "d" and a value "$\Delta$Xn" which is a fraction of the value "Xn", according to the equations (7) and (8) given below.

$$e = (b-a) \Delta Xn + a \quad (7)$$

$$f = (d-c) \Delta Xn + c \quad (8)$$

The output engine torque "Te" is determined by interpolation, based on the obtained values "e" and "f", and a value "$\Delta$Y$\theta$" which is a fraction of the value "Y$\theta$", according to the following equation (9):

$$Te = (f-e) \Delta Y\theta + e \quad (9)$$

FIG. 5 shows only a part of the data map in order to illustrate the calculation of the value "Te" by interpolation.

Figure 6:
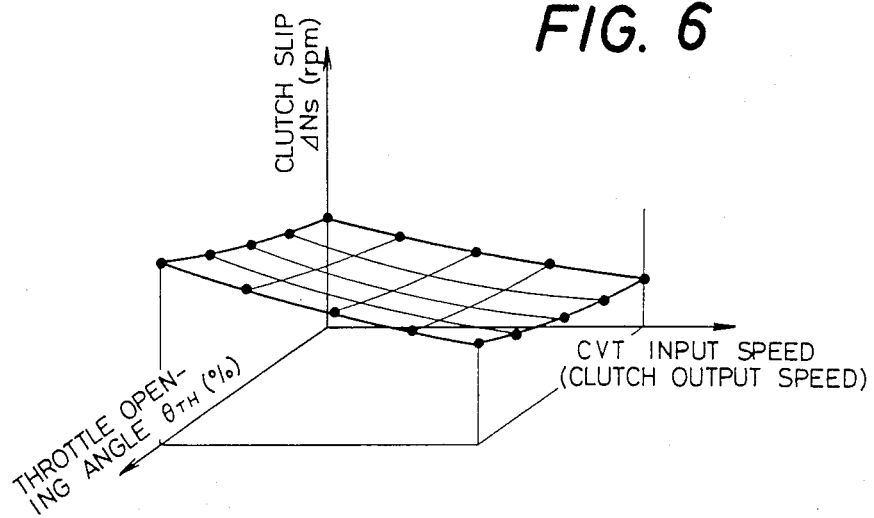
FIG. 6 is a graphical representation of another relation used in the control routine of FIG. 4 for determining the optimum amount of slip of the powder clutch, in the control routine of FIG. 4.

Referring to FIG. 4, the CPU 68 next goes to step S6 to determine a compensation value "$\Delta$Tcl" of the clutch torque "Tcl", by means of interpolation based on the throttle opening angle "$\theta$TH" and the input speed "Nin" of the transmission 16, according to a predetermined relation between these values. This predetermined relation, which is similar to that indicated in FIG. 6, is stored in the RAM 72. Initially, the RAM 72 stores a predetermined initial compensation value "$\Delta$Tcl" corresponding to selected values "$\theta$TH" and "Nin". However, the values of "$\Delta$Tcl" stored in the RAM 72 are updated in step S13. Specifically, each compensation value "$\Delta$Tcl" stored in the RAM 72 is replaced by a value which has been adjusted in step S10 or S11, as described later.

The above-described step S6 is followed by step S7 wherein a suitable slip speed "$\Delta$Ns" (rpm) of the powder clutch 14 is determined by interpolation based on the throttle opening angle "$\theta$TH" and the input speed "Nin" of the transmission 16, according to a predetermined relation between these values. This relation is represented as a data map stored in the ROM 70, an example of which is illustrated in FIG. 6. The data map is determined through experimentation such that the amount of slip of the powder clutch 14, represented as the slip speed "$\Delta$Ns", increases directly with the throttle opening angle "$\theta$TH" and decreases with an increase in the input speed "Nin" of the transmission 16. In other words, the slip speed "$\Delta$Ns" of the powder clutch 14 is determined so that the powder clutch 14 may absorb a variation in the output torque of the engine 10, while assuring maximum fuel economy of the vehicle.

Next in FIG. 4, the CPU 68 processes step S8 in which the optimum or target speed "N*" of the engine 10 is calculated by adding the clutch slip speed "$\Delta$Ns" determined in step S7, to the input speed "Nin". Step S8 is followed by step S9 wherein the CPU 68 checks if the target engine speed "N*" is higher than the actual engine speed "Ne". If the target engine speed "N*" is not higher than the actual engine speed "Ne", step S9 is followed by step S10 in which the compensation value "ΔTcl" determined in step S6 is adjusted by adding a predetermined very small adjustment value "ΔTc". The significance of this step S10 lies in that if the actual engine speed "Ne" is higher than the target engine speed "N*", the powder clutch 14 is controlled so as to increase the clutch torque "Tcl" and thereby lower the actual engine speed "Ne" into agreement with the target engine speed "N*". On the other hand, if the target engine speed "N*" is higher than the actual engine speed "Ne", the CPU 68 goes to step S11 in which the compensation value "ΔTcl" determined in step S6 is adjusted by subtracting the predetermined adjustment value "ΔTc" from the compensation value "ΔTcl". In other words, if the actual engine speed "Ne" is lower than the target engine speed "N*", the clutch torque "Tcl" is reduced so as to allow the engine speed "Ne" to be raised up to the target engine speed "N*".

Step S10 or S11 is followed by step S12 in which a final control value of the clutch torque "Tcl" is calculated by adding the adjusted compensation value "ΔTcl", obtained in step S10 or S11, to the output torque "Te" of the engine 10. In step S13, the compensation value "ΔTcl" which is currently stored in the RAM 72 and which was used in step S6, is replaced by the adjusted compensation value "ΔTcl", as adjusted in step S10 or S11. This adjusted compensation value "ΔTcl" will be used in the next control cycle. Subsequently, the CPU 68 goes to step S14 wherein the CPU 68 supplies to the V/I converter 76 via the D/A converter 74 a coil-control signal that permits the V/I converter 76 to apply a controlled electric current to the electromagnetic coil 20, controlling the engagement of the powder clutch 14 so as to establish the clutch torque "Tcl" determined in step S12.

The above-described control cycle, consisting of steps S1-S2 and S5-S14, for the normal-engagement mode of the powder clutch 14 is repeated at or above the frequency of variation in the output torque of the engine 10, which depends on the ignition frequency of the engine 10. With the control cycle thus repeated, the electric current to be applied to the coil 20 is controlled so that the amount of slip speed of the powder clutch 14 coincides with the optimum value "ΔNs" determined in step S7. In other words, the engagement of the powder clutch 14 is controlled so that a variation in the output torque of the engine 10 may be absorbed through a controlled amount of slip in the powder clutch 14.

In the control apparatus according to the present embodiment of the invention, an optimum value of the slip speed "ΔNs" is determined based on the throttle opening angle "θTH" and the output speed "Nin" of the powder clutch 14. The clutch torque "Tcl" of the powder clutch 14 is regulated so that the actual engine speed "Ne" coincides with the target speed "N*" which is the sum of the output speed "Nin" of the powder clutch 14 and the slip speed "ΔNs" of the powder clutch 14. In this arrangement, the powder clutch 14 is operated in such a manner as to absorb and accommodate a high frequency of fluctuation or variation in the output torque of the engine 10 and to maintain a high level of fuel economy of the vehicle while the engine 10 is operating in a low speed-high load condition. Hence, the preferred embodiment provides improved driving feel as well as minimum fuel consumption of the vehicle.

In the event of an abrupt change in the output torque of the engine 10, the slip speed "ΔNs" of the powder clutch 14 is determined fast enough to offset the torque change, while the basic control value "Tcl" of the engine torque is determined so that the actually detected output torque "Te" of the engine 10 may be substantially transmitted by the powder clutch 14. Thus, the control of the clutch torque "Tcl" of the powder clutch 14 will not cause an excessive amount of slip of the powder clutch 14, which would reduce the driving comfort and fuel economy of the vehicle.

Further, the amount of slip "ΔNs" of the powder clutch 14 may be smoothly and finely controlled, since the compensation value "ΔTcl" is adjusted by a very small adjustment value "ΔTc" in steps S10 and S11 so as to control the engine speed "Ne" to provide agreement with the target speed "N*".

As previously described, the compensation value "ΔTcl" is determined from the throttle opening angle "θTH" and the actual engine speed "Ne", according to a predetermined relation which is stored in the RAM 72 and which is updated in step S13. That is, the compensation values "ΔTcl" corresponding to selected combinations of the values "θTH" and "Ne" of the data map stored in the RAM 72 is updated by the adjustment of the compensation value "ΔTcl" in steps S10 and S11. Consequently, the compensation value "ΔTcl" to be obtained in step S6 meets different or changing conditions of the operating environments, including differences in the operating characteristics of different engines 10 on different vehicles; change in the operating characteristics of the same engine 10 during its service; and changes in atmospheric pressure or other operating conditions of the engine 10.

In this embodiment, it is understood from the foregoing description that a portion of the CPU 68 assigned to execute step S1 cooperates with the throttle sensor 54 to constitute means for detecting a currently required output of the engine 10, cooperates with the igniter 60 to constitute means for detecting an actual speed "Ne" of the engine 10, and cooperates with the input speed sensor 64 to constitute means for detecting the output speed "Nin" of the powder clutch 14; that a portion of the CPU 68 assigned to execute step S5 cooperates with the ROM 70 to constitute means for determining the current output torque "Te" of the engine and further constitutes means for determining the basic control value of the clutch torque "Tcl"; that a portion of the CPU 68 assigned to execute step S6 cooperates with the RAM 72 to constitute means for determining the compensation value "ΔTcl" of the clutch torque; that a portion of the CPU 68 assigned to execute step S7 cooperates with the ROM 70 to constitute means for determining the optimum slip speed "ΔNs" of the powder clutch 14; that a portion of the CPU 68 assigned to execute step S13 cooperates with the RAM 72 to constitute means for updating the stored predetermined relation used in step S6 between the values "ΔTcl", "θTH" and "Ne"; and that means for executing steps S6-S12 constitutes means for compensating the clutch torque "Tcl", which includes means for adjusting the compensation value "ΔTcl" in steps S9-S11.

Figure 7:
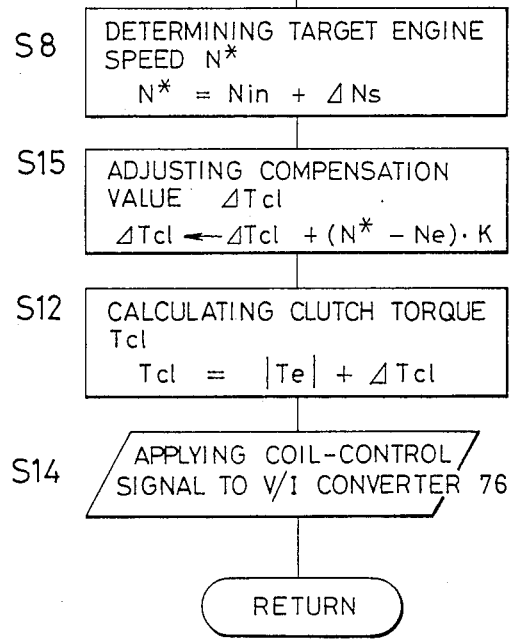
FIG. 7 is a flow chart showing part of a control routine which is executed according to a modified embodiment of the invention.

Referring to FIG. 7, a modified embodiment of the present invention will be described. In the figure, the same step numbers as used in FIG. 4 are used to identify the corresponding steps.

In this modified embodiment, step S15 is executed in place of steps S9-S11 of FIG. 4 of the preceding embodiment wherein a very small adjustment value "ΔTc" is added to or subtracted from the compensation value "ΔTcl" obtained in step S6. In step S15 of the modified embodiment, the compensation value "ΔTcl" is adjusted by the addition or subtraction of an adjustment value which is proportional to a difference between the target engine speed "N*" and the actual engine speed "Ne", as indicated in the following formula (10):

$$\Delta Tcl \leftarrow \Delta Tcl + (N^* - Ne) \cdot K \quad (10)$$

where, K: Constant (Gain)

Where the present invention has been described in its preferred embodiments with a certain degree of particularity, it is to be understood that the invention may be otherwise embodied.

Although the illustrated embodiments are adapted to determine in step S7 the slip speed "ΔNs" of the powder clutch 14, and determine in step S8 the target engine speed "N*" by adding the obtained clutch slip speed "ΔNs" to the input speed "Nin" of the transmission 16, it is possible to directly determine the target engine speed "N*" from the throttle opening angle "θTH" and the input speed "Nin", wherein the determined target engine speed "N*" is the sum of the input speed "Nin" and a suitable clutch slip speed "ΔNs".

Since the clutch torque "Tcl" is generally varied as a function of the amount of electric current applied to the electromagnetic coil 20, it is possible to adapt step S5 to determine as a basic control value the amount of electric current (or voltage) necessary for transmission of the output torque "Te" of the engine 10, and to use this basic control value with the compensation value "ΔTcl" in step S12.

While the opening angle "θTH" of the throttle valve 52 is used as a variable indicative of the currently required output of the engine 10, this variable may be replaced by other variables such as the amount of depression of an accelerator pedal of the vehicle.

It will be obvious to those skilled in the art that various other changes, modifications and improvements may be made in the invention, without departing from the spirit and scope of the invention defined in the appended claims.

What is claimed is:

1. A method for controlling an electromagnetic powder clutch which is incorporated in a power transmission system of a vehicle to transmit an output torque of an engine to drive wheels, said clutch including an electromagnetic coil for engaging the powder clutch such that a clutch torque to be transmitted by the powder clutch is varied as a function of an electric current to be applied to the electromagnetic coil, said method comprising the steps of:

detecting a currently required output of said engine;
  detecting an output speed of said powder clutch;
  determining an optimum slip speed of said power clutch based on the detected required output of the engine and the detected output speed of the powder clutch, according to a predetermined relation between said optimum slip speed, said required output of the engine and said output speed of the powder clutch;
  determining said output torque of the engine;
  determining whether the powder clutch should be operated in a partial-engagement mode, or in a normal-engagement mode wherein the powder clutch is substantially fully engaged; and
  if it is determined that the powder clutch should be operated in said normal-engagement mode, determining a basic control value for controlling a magnitude of said electric current based on the determined output torque of the engine, such that said magnitude of the electric current permits substantially full engagement of said powder clutch so that said clutch torque is substantially equal to said determined output torque of the engine, and compensating said basic control value, so as to provide said optimum slip speed, thereby adjusting said clutch torque to absorb a variation in the output torque of the engine.

2. A method according to claim 1, wherein said basic control value is compensated by a compensation value which is adjusted by the addition thereto or subtraction therefrom of a predetermined adjustment value.

3. A method according to claim 1, further comprising the steps of determining a target speed of said engine based on said detected output speed of said powder clutch, said determined optimum slip speed of said powder clutch and said detected actual speed of said engine, wherein said basic control value is compensated by a compensation value which is adjusted by the addition thereto or subtraction therefrom of an adjustment value that is variable in proportion to a difference between said target speed and said actual speed of the engine.

4. A method according to claim 1, wherein said basic control value is compensated by a compensation value which is determined based on said detected required output of said engine and said detected output speed of said powder clutch, according to a predetermined relation between said compensation value, said detected required output of the engine and said detected output speed of the powder clutch, said predetermined relation being stored in a memory and updated in each control cycle of the method.

5. A method according to claim 1, further comprising a step of detecting an actual speed of said engine, wherein said output torque of said engine is determined based on said detected required output of said engine and said detected actual speed of said engine, according to a predetermined relation between said output torque, said required output and said actual speed of said engine.

6. An apparatus for controlling an electromagnetic powder clutch which is incorporated in a power transmission system of a vehicle to transmit an output torque of an engine to drive wheels, said clutch including an electromagnetic coil for engaging the powder clutch such that a clutch torque to be transmitted by the powder clutch is varied as a function of an electric current to be applied to the electromagnetic coil, said apparatus comprising:

output detecting means for detecting a currently required output of said engine;
  speed detecting means for detecting an output speed of said powder clutch;
  means for determining an optimum slip speed of said powder clutch based on the detected required output of the engine and the detected output speed of the powder clutch, according to a predetermined relation between said optimum slip speed, said required output of the engine and said output speed of the powder clutch;
  means for determining said output torque of the engine;
  means for determining whether the powder clutch should be operated in a partial-engagement mode, or in a normal-engagement mode wherein the powder clutch is substantially fully engaged; and means for determining, it if is determined that the powder clutch should be operated in said normal-engagement mode, a basic control value for controlling a magnitude of said electric current based on the determined output torque of the engine, such that said magnitude of the electric current permits substantially full engagement of said powder clutch so as to provide aid output torque of said engine substantially as said clutch torque, and for compensating said basic control value, so as to provide said optimum slip speed, thereby adjusting said clutch torque to absorb a variation in the output torque of the engine.

7. An apparatus according to claim 6, further comprising means for determining a target speed of said engine by adding said optimum slip speed of said powder clutch to said detected output speed of said powder clutch, and means for detecting an actual speed of said engine, wherein said compensating means comprises means for determining a compensation value based on said detected required output of the engine and said detected output speed of the powder clutch, according to a predetermined relation between said compensation value, said required output of the engine and said output speed of said powder clutch, said compensating means further comprising means for adjusting said determined compensation value to be added to or subtracted from said basic control value, such that said detected actual speed of said engine coincides with said determined target speed of said engine.

8. An apparatus according to claim 7, wherein said compensating means comprises a memory for storing data representative of said predetermined relation between said compensation value, said required output of the engine and said output speed of the powder clutch, said compensating means further comprising means for replacing said compensation value currently stored in said memory with said determined compensation value which has been adjusted by said adjusting means, whereby said predetermined relation stored in said memory is updated in each control cycle of the apparatus.

* * * * *